Sept. 8, 1931.   R. R. CANDOR   1,822,583
REFRIGERATING APPARATUS
Filed Feb. 27, 1930   2 Sheets-Sheet 1

INVENTOR
Robert R. Candor
BY
Spencer, Hardman & Ashe
ATTORNEYS

Sept. 8, 1931.  R. R. CANDOR  1,822,583
REFRIGERATING APPARATUS
Filed Feb. 27, 1930   2 Sheets-Sheet 2

Robt R Candor INVENTOR
BY
ATTORNEYS

Patented Sept. 8, 1931

1,822,583

UNITED STATES PATENT OFFICE

ROBERT R. CANDOR, OF DAYTON, OHIO, ASSIGNOR TO FRIGIDAIRE CORPORATION, OF DAYTON, OHIO, A CORPORATION OF DELAWARE

REFRIGERATING APPARATUS

Application filed February 27, 1930. Serial No. 431,760.

This invention relates to refrigerating apparatus and more particularly to an apparatus for cooling liquids, such as drinking water, beverages or the like.

An object of this invention is to provide an apparatus for cooling liquids which apparatus is of relatively large cooling capacity.

Another object of this invention is to provide an apparatus having a storage and cooling receptacle adapted to contain a relatively large amount of cooled liquid to supply a sudden heavy demand, and which apparatus is provided with means for supplying liquid to said receptacle, which liquid has been preliminarily cooled before being introduced into said receptacle, the cooling action in said means being sufficient to prevent appreciable warming of the liquid in the receptacle by the inflowing liquid.

Further objects and advantages of the present invention will be apparent from the following description, reference being had to the accompanying drawings, wherein a preferred form of the present invention is clearly shown.

Figure 1:
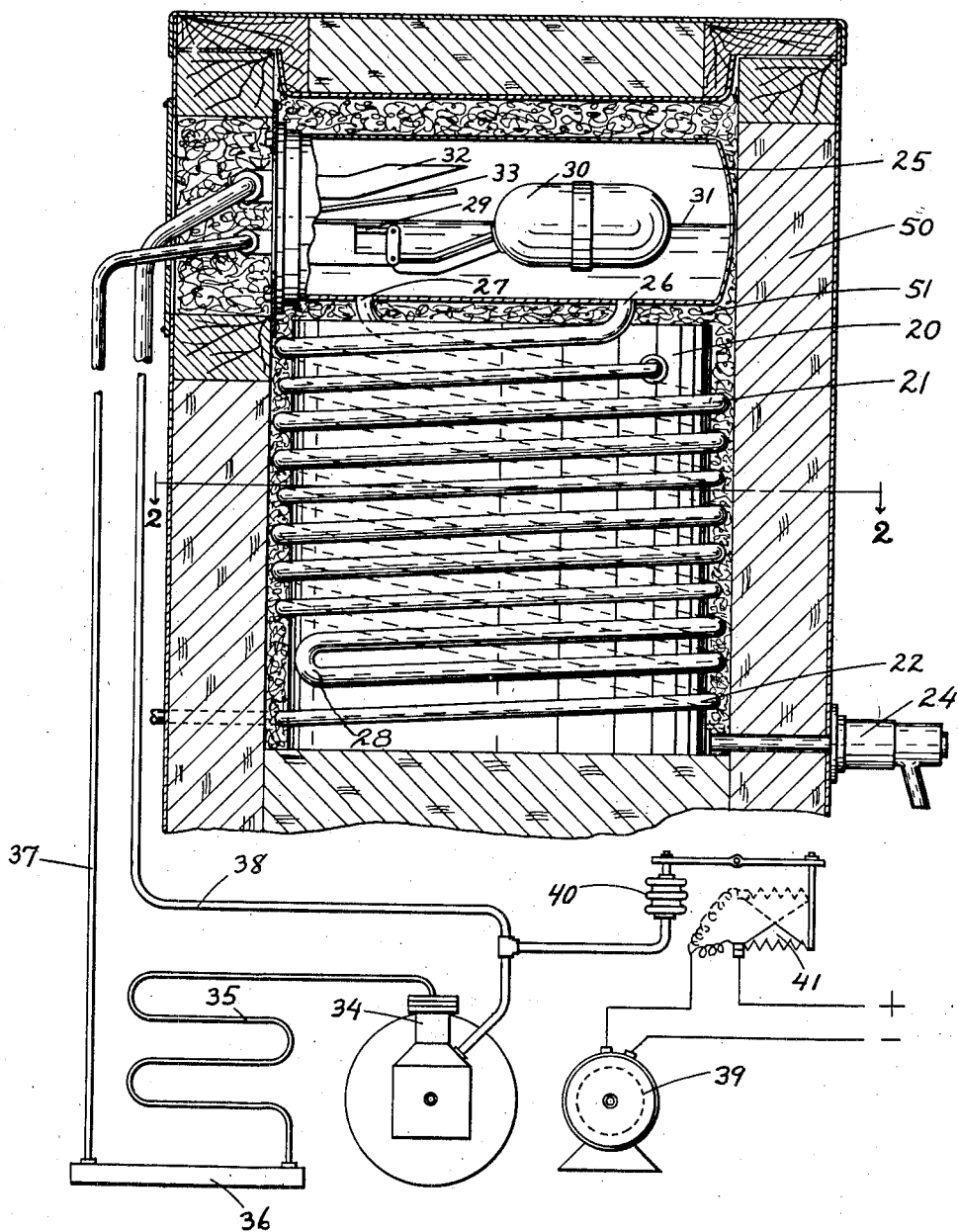
Fig. 1 is a vertical cross-sectional view, with certain portions shown diagrammatically, of an apparatus embodying features of this invention.
Figure 3:
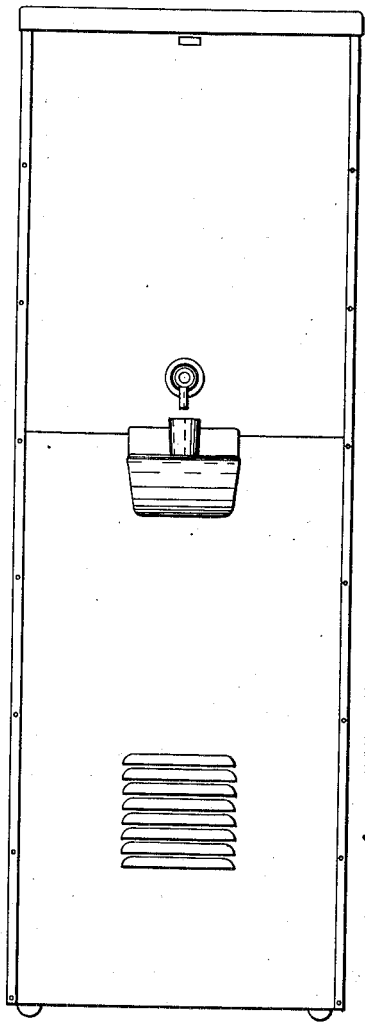
Fig. 3 is a front elevation of an apparatus, such as shown in Figs. 1 and 2.

An apparatus embodying features of this invention may comprise in general a liquid container 20 provided with means 21 for cooling, and maintaining cold, a body of liquid within the container 20 and it may also include means 22 for introducing liquid into the container 20, preferably in a precooled or partially cooled condition, the cooling action in means 22 being sufficient to prevent appreciable warming of the liquid in the container 20 by the inflowing liquid.

Preferably the liquid container 20 is a metal walled cylindrical container. The means 21 for cooling preferably is a refrigerant passage forming means such as a pipe, or pipes, spirally arranged around the container in thermal contact with the wall. The thermal contact may be enhanced, for instance, by soldering or welding as shown at 23. The means 22 for introducing liquid into the container 20 preferably is a liquid supply passage forming means such as a pipe also spirally arranged around the container 20 and in thermal contact therewith. The thermal contact in this case may also be enhanced by welding or soldering as indicated at 23. Means for withdrawing the liquid from the container 20 may also be provided, and preferably this may be accomplished by providing a faucet 24 connected to the lower end of the container 20.

In the modification shown in Figs. 1 to 4 inclusive the refrigerant pipe 21 may be provided with means for maintaining the pipe 21 filled with liquid refrigerant. This may be accomplished by providing a header 25 to which one or more pipes 21 are connected so that liquid refrigerant in the header 25 flows and fills the pipe or pipes 21. As specifically shown there is a single pipe with one or both of its ends 26 and 27 connected to the boiler 25 below the level of the liquid. The pipe is wound around the container 20 and looped at 28 in a reverse bend in order that both ends 26 and 27 may be connected to the header 25. The header 25 may be provided with a valve 29 controlled by the float 30 in such a manner as to maintain a level 31 of liquid within the container 20. Evaporated refrigerant may leave through a funnel-shaped fitting 32 guarded, if preferred, by a baffle plate 33. Further details of the structure of the header 25 are disclosed in the patent to R. G. Osborn, No. 1,556,708, patented October 13, 1925.

A refrigerant liquefying unit may be connected to the header 25. Preferably this includes a compressor 34 delivering compressed refrigerant to a condenser 35 from which the condensed refrigerant is collected in a liquid refrigerant receiver 36. From thence the liquid refrigerant is delivered by means of a pipe 37 to a fitting connected to the valve 29 so that the entrance of liquid refrigerant into the header 25 is controlled by the valve 29. The evaporated refrigerant leaving through the funnel-shaped fitting 32 returns by means of the pipe 38 to the compressor 34. Means may be provided for maintaining desired temperature conditions within the apparatus. Preferably this is accomplished by maintaining the liquid refrigerant in the header 25 at a substantially constant temperature by providing a control for the motor 39. This control may include a bellows 40 connected to the snap switch 41 which starts and stops the motor 39. The bellows 40 is connected to the pipe 38 so that the motor 39 starts and stops in accordance with pressure-temperature conditions in the header 25. Temperatures are maintained such that freezing of the liquid in the pipe 21 is avoided.

Liquid flows through pipe 22 and is partially cooled before being delivered through the fitting 41 into the container 20 preferably at the upper portion of the container 20. Thus the liquid delivered to the container 20 is partially cooled and there is no danger of substantially uncooled liquid being delivered to the faucet 24.

Insulation may be provided for the refrigerated parts of the apparatus. Thus a cabinet may be placed around the container 20 together with the header 25 and the associated pipes. The cabinet may include relatively self-sustaining insulation 50 and relatively loose insulation 51 placed around the container pipes and header. If desired, the refrigerant liquefying unit may be placed in the lower portion of the cabinet below the container 20.

Figure 5:
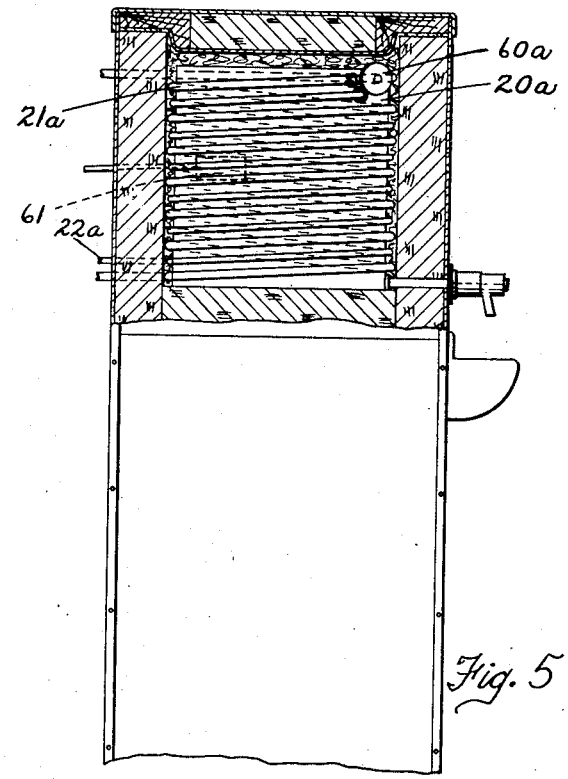
Fig. 5 is a vertical view, partly in section and partly in elevation, of a slightly modified form.
Figure 4:
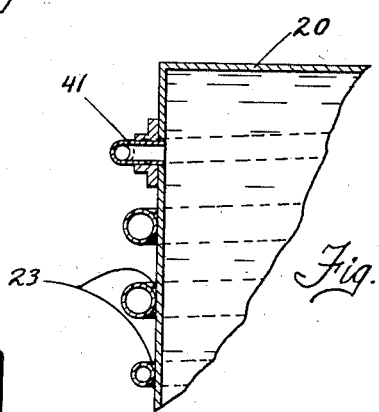
Fig. 4 is an enlarged cross-sectional view of a portion of the apparatus shown in Figs. 1, 2 and 3.
Figure 2:
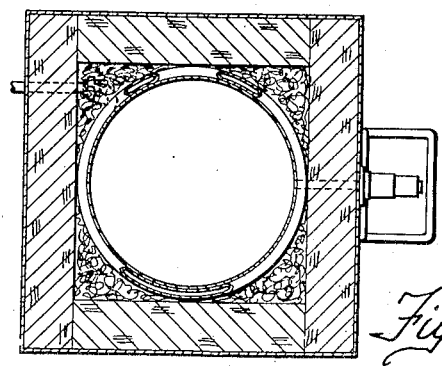
Fig. 2 is a horizontal cross-sectional view taken along the line 2—2 of Fig. 1.

In the modification shown in Fig. 5, the container 20a may have a refrigerant pipe 21a spirally wound around it. The liquid supply pipe 22a may also be wound around the container 20a. In this case the refrigerant is expanded by an automatic expansion valve 60 which automatically maintains a predetermined pressure within the pipe 21a. The refrigerant liquefying unit may be automatically controlled by a thermostat, a portion of which may include the thermostatic bulb 61 placed, for instance, in the container 60. The expanded refrigerant thus flows downwardly through the spiral pipe 21a and the liquid to be cooled flows upwardly in the spiral pipe 22a. Other portions of the apparatus may be substantially as shown or described with respect to Figs. 1 to 4 inclusive.

While the form of embodiment of the invention as herein disclosed, constitutes a preferred form, it is to be understood that other forms might be adopted, all coming within the scope of the claims which follow.

What is claimed is as follows:

1. A liquid cooling apparatus comprising a metal walled liquid container, a liquid supply means for said container forming a passage spirally arranged around said container in thermal contact with said wall and connected to said container at its upper portion, means forming a refrigerant passage spirally arranged around said container in thermal contact with said wall and interposed between loops of said liquid supply means, and means for withdrawing liquid from said container at its lower portion.

2. A liquid cooling apparatus comprising a metal walled liquid container, a liquid supply means for said container forming a passage spirally arranged around said container in thermal contact with said wall and connected to said container at its upper portion, means forming a refrigerant passage spirally arranged around said container in thermal contact with said wall and interposed between loops of said liquid supply means, insulation around both said means and means for withdrawing liquid from said container at its lower portion.

3. A liquid cooling apparatus comprising a metal walled cylindrical liquid container, a liquid supply means for said container forming a passage spirally arranged around said container in thermal contact with said wall and connected to said container at its upper portion, means forming a refrigerant passage spirally arranged around said container in thermal contact with said wall and interposed between loops of said liquid supply means, and means for withdrawing liquid from said container at its lower portion.

4. A liquid cooling apparatus comprising a metal walled cylindrical liquid container, a liquid supply means for said container forming a passage spirally arranged around said container in thermal contact with said wall and connected to said container at its upper portion, means forming a refrigerant passage spirally arranged around said container in thermal contact with said wall and interposed between loops of said liquid supply means insulation around both said means and means for withdrawing liquid from said container at its lower portion.

5. A liquid cooling apparatus comprising a metal walled liquid container, a liquid supply means for said container forming a passage spirally arranged around said container in thermal contact with said wall and connected to said container, means forming a refrigerant passage spirally arranged around said container in thermal contact with said wall and interposed between loops of said liquid supply means, and means for withdrawing liquid from said container at its lower portion.

In testimony whereof I hereto affix my signature.

ROBERT R. CANDOR.